United States Patent

Kim

[19]

[11] Patent Number: 5,884,206
[45] Date of Patent: Mar. 16, 1999

[54] DISTRIBUTED CONTROL SYSTEM FOR HEAVY CONSTRUCTION MACHINE

[75] Inventor: Tae Yeon Kim, Changwon, Rep. of Korea

[73] Assignee: Samsung Heavy Industries Co., Ltd., Kyung Nam, Rep. of Korea

[21] Appl. No.: 745,408

[22] Filed: Nov. 8, 1996

[51] Int. Cl.$^6$ .............................. G06F 7/70; G06F 19/00
[52] U.S. Cl. .................... 701/50; 701/33; 701/29
[58] Field of Search ................ 701/29, 33, 50, 701/48, 45, 1, 31, 34, 35, 114, 115; 280/735; 364/184; 371/67.1

[56] References Cited

U.S. PATENT DOCUMENTS

| | | | |
|---|---|---|---|
| 4,906,970 | 3/1990 | Momura | 340/459 |
| 4,943,919 | 7/1990 | Aslin et al. | 364/424.03 |
| 5,428,535 | 6/1995 | Katsumata et al. | 364/424.05 |
| 5,555,171 | 9/1996 | Sonehara et al. | 364/424.03 |
| 5,638,272 | 6/1997 | Minowa et al. | 364/423.098 |
| 5,671,141 | 9/1997 | Smith et al. | 364/424.034 |
| 5,687,081 | 11/1997 | Wellman et al. | 364/424.07 |
| 5,699,250 | 12/1997 | Kobayashi | 364/424.058 |
| 5,712,784 | 1/1998 | Fendt et al. | 364/424.055 |

FOREIGN PATENT DOCUMENTS

0 598 936  6/1994  European Pat. Off. .

*Primary Examiner*—William A. Cuchlinski, Jr.
*Assistant Examiner*—Tim Wyckoff
*Attorney, Agent, or Firm*—Kenyon & Kenyon

[57] ABSTRACT

A distributed control system for a heavy construction machine, comprising a plurality of modules into which components in the heavy construction machine are classified according to functions and positions. The modules are individually controlled and each of them exchanges information with a different one of the modules through a single line. According to the present invention, the number of wires is significantly reduced, thereby making the wiring in assembling and repairing very easy. Also, when the heavy construction machine fails, the corresponding portion can readily be grasped and repaired. Further, the model and function of the heavy construction machine can readily be modified.

9 Claims, 5 Drawing Sheets

DISTRIBUTED CONTROL SYSTEM FOR HEAVY CONSTRUCTION MACHINE

BACKGROUND OF THE INVENTION

1. Field of the Invention

The present invention relates in general to distributed control systems for heavy construction machines, and more particularly to a distributed control system for a heavy construction machine which is capable of controlling electric and electronic components in the heavy construction machine in a decentralized manner such that in a decentralized manner such that the control system transmit and receive data through respective communication lines.

2. Description of the Prior Art

Generally, a heavy construction machine is equipped with a plurality of sensors for transmitting signals to a controller or an indication unit through lines or connectors. As the sensors are increased in number, the mechanical reliability of the heavy construction machine is reduced.

Further, the number of sensors is necessarily increased still more as the heavy construction machine is sort to be enhanced in performance. The increased number of sensors results in an increase in the number of wires, which in turn results in an increase in the cost.

A distributed control system is used in a heavy construction machine to perform a fault diagnostic operation for the heavy construction machine at once on the spot. As a result of the fault diagnostic operation, the heavy construction machine may be repaired by simply replacing a faulty module with a new one. In this manner, the planned operation of the heavy construction machine is hardly frustrated.

The distributed control system has a self-diagnostic function for each of the modules and allows the modules to exchange desired information among them. In this light, it can be seen that the distributed control system is an essential, required element required for individual control operations in construction machines, vehicles, ships, airplanes and etc. in which operation/maintenance must readily be performed.

In a conventional distributed control system for a heavy construction machine, signals corresponding to the chosen operation of an operator are transferred to component controllers through respective lines. Also, signals from various sensors are transferred to a main controller through respective lines.

For these reasons, as the functions of the heavy construction machine become more various, the number of wires is increased, resulting in a difficulty in wiring and increases in load and volume.

The increased number of wires also results in an increase in the number of connectors, thereby making it difficult to recognize the wired state in a terminal. These consideration pose a difficulty in designing the control system for the heavy construction machine.

Further, when a fault is caused due to poor line contact or wire disconnection, the corresponding portion of the control system cannot be readily identified. As a result, the repair, resulting in an increase in consumer's dissatisfaction.

SUMMARY OF THE INVENTION

The present invention has been made in view of the above problems, and it is an object of the present invention to provide a distributed control system for a heavy construction machine which is adapted for increased ease of design and assembly of the heavy construction machine.

It is another object of the present invention to provide a distributed control system for a heavy construction machine which is capable of modularizing components in the heavy construction machine into a plurality of parts to readily control them.

It is a further object of the present invention to provide a distributed control system for a heavy construction machine which is capable of, when the heavy construction machine fails, readily indentifying and repairing the corresponding portion.

It is yet another object of the present invention to provide a distributed control system for a heavy construction machine which is capable of readily modifying the model, or the desired tasks, and function of the heavy construction machine.

In accordance with the present invention, the above and other objects can be accomplished by a provision of a distributed control system for a heavy construction machine, which control system has a plurality of control modules into which components in the heavy construction machine correspondingly are classified according to functions and positions, the modules being individually controlled, each of the modules exchanging information with a different one of the modules through a single line.

The modules are individually constructed in such a manner that at least one thereof can be removed or at least one new module can additionally be provided.

Each of the modules includes: a main controller for controlling components in a corresponding one of the modules;

an input/output terminal for performing a signal input/output operation with a different one of the modules under the control of the main controller; a communication controller for storing therein data to be communicated and outputting the stored data under the control of the main controller; and a memory for storing therein a program for performing a function of the corresponding module and outputting the stored program under the control of the main controller.

The modules are categorized as an operation module, an engine module and a hydraulic module.

The operation module is programmed to perform the first step of providing an initialization packet if the system is started; the second step of transmitting the provided packet to the engine module or hydraulic module and entering a reception mode; the third step of receiving a packet from the engine module or hydraulic module; the fourth step of processing data in the received packet to control various indicators according to allocated addresses; and the fifth step of providing the subsequent packet and changing a transmission/reception target module.

The engine module or hydraulic module is programmed to perform the first step of entering a reception mode and receiving a packet from the operation module; the second step of processing data in the received packet to drive various actuators in accordance with the processed data; the third step of receiving data from various sensors and transmitting the received data in the form of packet to the operation module; and the fourth step of entering the reception mode.

The received packet includes an error correction code for checking the presence of an error therein.

The distributed control system further comprises a timer for counting a packet reception time to enhance the responsiveness of the system.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
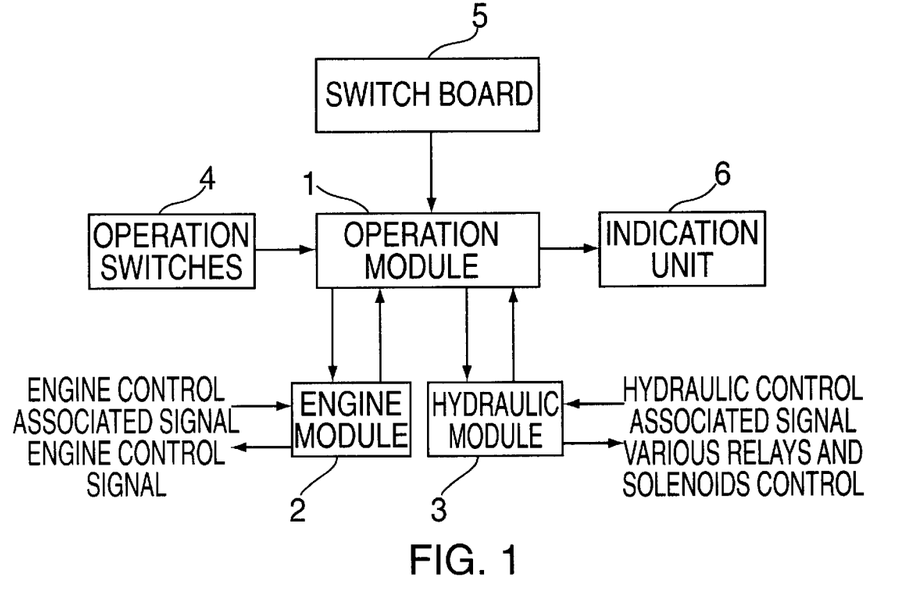
FIG. 1 is a schematic block diagram illustrating the construction of a distributed control system for a heavy construction machine in accordance with the present invention.

Referring to FIG. 1, there is schematically shown in block form the construction of a distributed control system for a heavy construction machine in accordance with the present invention. The principle of the present invention is to modularize the components in the heavy construction machine into a plurality of modules in accordance with positions and functions of various actuators and sensors in the heavy construction machine, and to perform control and self-diagnostic functions by individual modules.

As shown in FIG. 1, the components in the heavy construction machine may be modularized into three parts, or an operation module 1, an engine module 2 and a hydraulic module 3. The operation module 1 is connected to various operation switches 4 associated with the operation of the heavy construction machine, an indication unit 6 which indicates the status of the heavy construction machine and convenient facilities to the operator. The engine module 2 is connected to various sensors, valves and motors associated with an engine system. The hydraulic module 3 is connected to a transmission, various solenoids such as a safety solenoid and various sensors associated with the traveling and working of the heavy construction machine.

The operation module 1 is adapted to receive signals from a switch board 5 and the operation switches 4 operated by the operator and output information associated with the received signals to the engine module 2 and hydraulic module 3. Further, the operation module 1 receives various information from the engine module 2 and hydraulic module 3 and controls the indication unit 6 in response to the received information to inform the operator of the status of the heavy construction machine. The indication unit 6 includes various panels and indication lamps.

The engine module 2 is adapted to output various control signals to an engine (not shown) in response to the output information from the operation module 1. Further, the engine module 2 receives various information from the engine and transfers the received information to the operation module 1.

The hydraulic module 3 is adapted to output various control signals to various relays and solenoids (not shown) in response to the output information from the operation module 1. Further, the hydraulic module 3 receives various information from a hydraulic system (not shown) and transfers the received information to the operation module 1.

In other words, the engine module 2 operates various actuators connected thereto in response to a command from the operation module 1 and shares information from various sensors connected thereto with the operation module 1. The hydraulic module 3 shares information from various actuators and sensors connected thereto with the operation module 1.

Noticeably, for the purpose of the information exchange with the engine module 2 and hydraulic module 3, the operation module 1 must appropriately allocate communication ports to the engine module 2 and hydraulic module 3 according to information exchange amount per unit time. Also, it is preferred to transmit and receive the information between the operation module 1 and the engine module 2 and hydraulic module 3 in the form of a packet with a desired size according to an allocated address.

Figure 2:
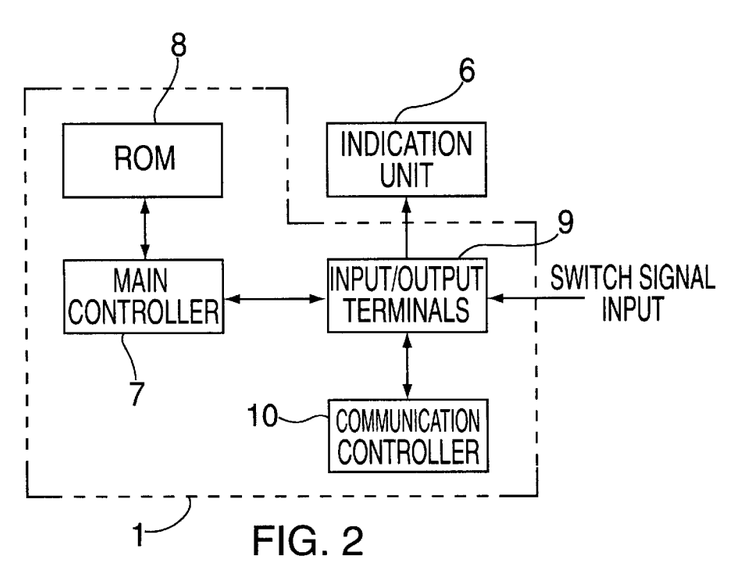
FIG. 2 is a detailed block diagram representative of each one of an operation module, an engine module and a hydraulic module in FIG. 1.

FIG. 2 is a detailed block diagram representative of each of the operation module 1, engine module 2 and hydraulic module 3 shown in FIG. 1. As shown in this drawing, each module includes a main controller 7, a read only memory (referred to hereinafter as ROM) 8, input/output terminals 9 and a communication controller 10. The main controller 7 is adapted to analyze a received packet and perform a control algorithm as a result of the analysis to operate actuators connected to the corresponding module. The input/output terminals 9 are adapted to perform a signal input/output operation between the corresponding module and actuators and sensors connected thereto. Each module transmits various data obtained from the associated sensors to a different module in the form of a packet based on an output format. The communication controller 10 is adapted to take exclusive charge of only communication with a different module to reduce a communication load of the main controller 7. Namely, the communication controller 10 processes only the packet transmission and reception.

The operation of the operation module 1 will hereinafter be described with reference to FIG. 2.

In the operation module 1, the main controller 7 includes a 16-bit microprocessor for processing much more signals at the same processing speed, as compared with the different modules 2 and 3. Because the amount of data or flag to be stored is relatively small as compared with the signal processing algorithm, the main controller 7 utilizes a random access memory (referred to hereinafter as RAM) in the processor. The operation module 1 communicates with the different modules 2 and 3, continuously checks the signals from the switch board 5 and operation switches 4, and operates the indication unit 6. In this connection, the communication controller 10 is provided in the operation module 1 to reduce the communication load of the main controller 7, resulting in an increase in efficiency. The communication controller 10 stores communication data therein and outputs the stored data according to a request from the main controller 7. The input/output terminals 9 are extended in a memory mapped input/output manner to input/output many input/output signals. Inherent addresses are allocated to the input/output terminals 9 to drive the corresponding indication lamps, panels and relays. A program regarding the entire function of the operation module 1 is stored in the ROM 8. As a result, the operation module 1 can perform its function regardless of a power state.

The engine module 2 and hydraulic module 3 are substantially the same in block construction as the operation module 1. However, in the engine module 2, the main controller 7 may preferably include a 32-bit digital signal processor (DSP) for performing a signal processing operation at high speed and degree to enhance the efficiency of the engine.

The operations of the operation module 1, engine module 2 and hydraulic module 3 are controlled by controlling the information exchange among the operation module 1 and the engine module 2 and hydraulic module 3.

Figure 3:
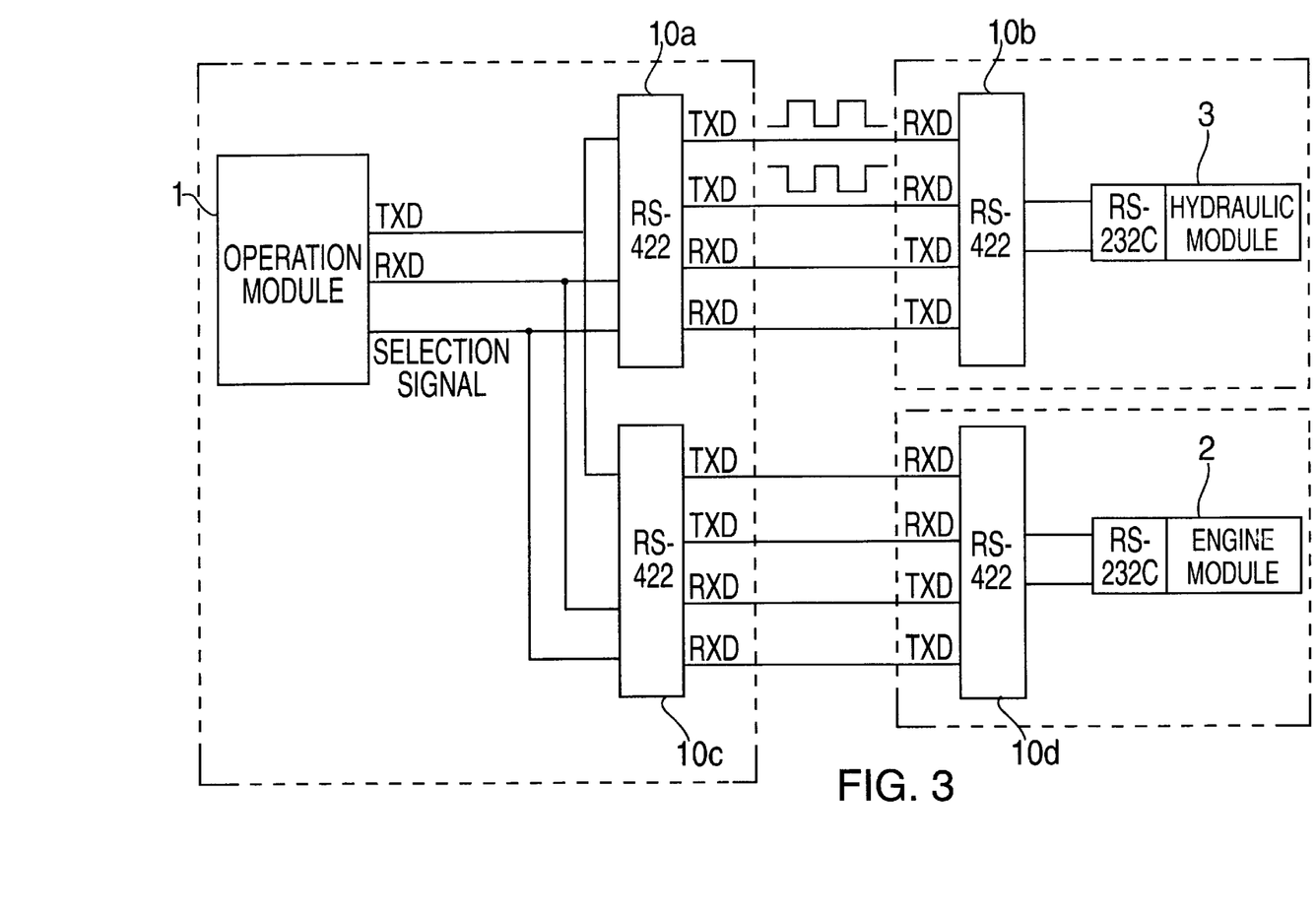
FIG. 3 is a schematic block diagram illustrating a hardware for communications between the operation module and the engine module and or the hydraulic module in FIG. 1 in accordance with the present invention.

FIG. 3 is a schematic block diagram illustrating a hardware for the communications between the operation module 1 and the engine module 2 or the hydraulic module 3 shown in FIG. 1 in accordance with the present invention. As shown in this drawing, addresses are allocated at the transmission and reception stages for the efficient information exchange.

Also, packets are defined according to the allocated addresses.

In FIG. 3, when a selection signal is high in logic, communication controllers 10a and 10b perform the communication between the operation module 1 and the hydraulic module 3. To the contrary, in the case where the selection signal is low in logic, communication controllers 10c and 10d perform the communication between the operation module 1 and he engine module 2. Because the communications between the operation module 1 and the engine module 2 or the hydraulic module 3 are performed around the operation module 1, the selection signal is controlled by the operation module 1 to determine the communication direction. Noticeably, packets must be defined for the discrimination among data from various sensors connected to the engine module 2. In the case where no packet is defined, the transmission stage must always indicate devices' addresses associated with transmission data, resulting in an ease in communication amount.

The below Tables 1 and 2 show signals transmitted and received between the operation module 1 and the engine module 2. A digital signal is allocated with at least one bit to be recognizable. An analog signal is converted into the digital signal by an 8-bit analog/digital (referred to hereinafter as AID) converter with a 256-resolution, which is well-known in the art.

The following Table 1 shows signals which are transmitted from the operation module 1 to the engine module 2.

TABLE 1

| Name | Input | Output | Allocated bit for communication |
|---|---|---|---|
| Start switch | ON/OFF | Start motor ON | 2 |
| Fuel heat switch | ON/OFF | Rear lamp and alarm ON | 1 |
| Rear lamp/alarm | ON/OFF | Rear lamp and alarm ON | 1 |
| Stop/number plate lamp | ON/OFF | Stop and number plate lamps ON | 2 |
| Left/right turning direction indication | ON/OFF | Left and right turning direction indication lamps ON | 2 |

In the above Table 1, a 2-bit start switch signal indicates ON/OFF states of preheat and start switches, a 2-bit left/right turning direction indication lamp signal indicates ON/OFF states of left and right turning direction indication lamps, a 2-bit stop/number plate lamp signal indicates ON/OFF states of stop and number plate lamps, a 1-bit fuel heat switch, signal indicates ON/OFF states of a fuel heat switch and a 1-bit rear lamp/alarm signal indicates ON/OFF states of a rear lamp and an alarm. As a result, the operation module 1 transmits an 8-bit data frame to the engine module 2.

The following Table 2 shows signals which are transmitted from the engine module 2 to the operation module 1.

TABLE 2

| Name | Input | Output | Allocated bit for communication |
|---|---|---|---|
| Charge abnormal warning lamp | Current I | Panel | 1 |
| Tachometer | Square wave | Panel | 8 |
| Cooling water temperature gauge | 10–200Ω | Panel | 8 |
| Air cleaner warning lamp | ON/OFF | Panel | 1 |
| Engine oil pressure warning lamp | ON/OFF | Panel | 1 |
| Hydraulic oil temperature gauge | 10–200Ω | Panel | 8 |

As seen from the above Table 2, the signals which are transmitted from the engine module 2 to the operation module 1 are a 1-bit charge abnormal warning lamp signal, a 1-bit air cleaner warning lamp signal, a 1-bit engine oil pressure warning lamp signal, an 8-bit hydraulic oil temperature gauge signal, an 8-bit tachometer signal and an 8-bit cooling water temperature gauge signal. The cooling water temperature gauge is adapted to sense an overheat state of the engine. The tachometer utilizes a square wave from an alternator. Signals from the above components are converted into digital signals by the 8-bit A/D converter and then applied to the main controller 7.

The signals in the above Tables 1 and 2 can be transmitted in the form of packets shown in the below Tables 3–6.

The following Table 3 shows a format of a packet which is transmitted from the operation module 1 to the engine module 2 and the number of bits allocated thereto.

TABLE 3

| Start of frame | data | CRC | End of frame |
|---|---|---|---|
| 8 | 8 | 8 | 8 |

The following Table 4 shows a format of data in the above Table 3.

TABLE 4

| 0 1 | 2 | 3 | 4 |
|---|---|---|---|
| Start switch | Fuel heat switch | Rear lamp/alarm | Number plate lamp |
| 5 | 6 | 7 | |
| Stop lamp | Right turning direction indication lamp | Left turning direction indication lamp | |

The following Table 5 shows a format of a packet which is transmitted the engine module 2 to the operation module 1 and the number of bits allocated thereto.

TABLE 5

| Start of frame | data | CRC | End of frame |
| --- | --- | --- | --- |
| 8 | 8 | 8 | 8 |

The following Table 6 shows a format of data in the above Table 5.

TABLE 6

| 1 2 3 4 5 6 7 | 8 9 10 11 12 13 14 | 15 16 17 18 19 20 21 22 23 |
| --- | --- | --- |
| Cooling water temperature gauge (A/D CONVERSION) | Hydraulic oil temperature gauge (A/D CONVERSION) | Tachometer (A/D CONVERSION) |

As seen from the above Table 3, the packet which is transmitted from the operation module 1 to the engine module 2 includes an 8-bit start frame, an 8-bit data field, 8 cyclic redundancy check (referred to hereinafter as CRC) bits for the error checking and an 8-bit end frame. The 8-bit data field is in detail shown in the above Table 4.

As seen from the above Table 5, the packet which is transmitted from the engine module 2 to the operation module 1 includes an 8-bit start frame, a 32-bit data field, 8 CRC bits for the error checking and an 8-bit end frame. The 32-bit data field is in detail shown in the above table 6. The four reserve bits are provided for the improvement in the performance of the heavy construction machine.

The above Tables 3–6 have been disclosed for illustrative purposes. Therefore, those skilled in the art will appreciate that the contents and allocated bits number can be modified.

Figure 4:
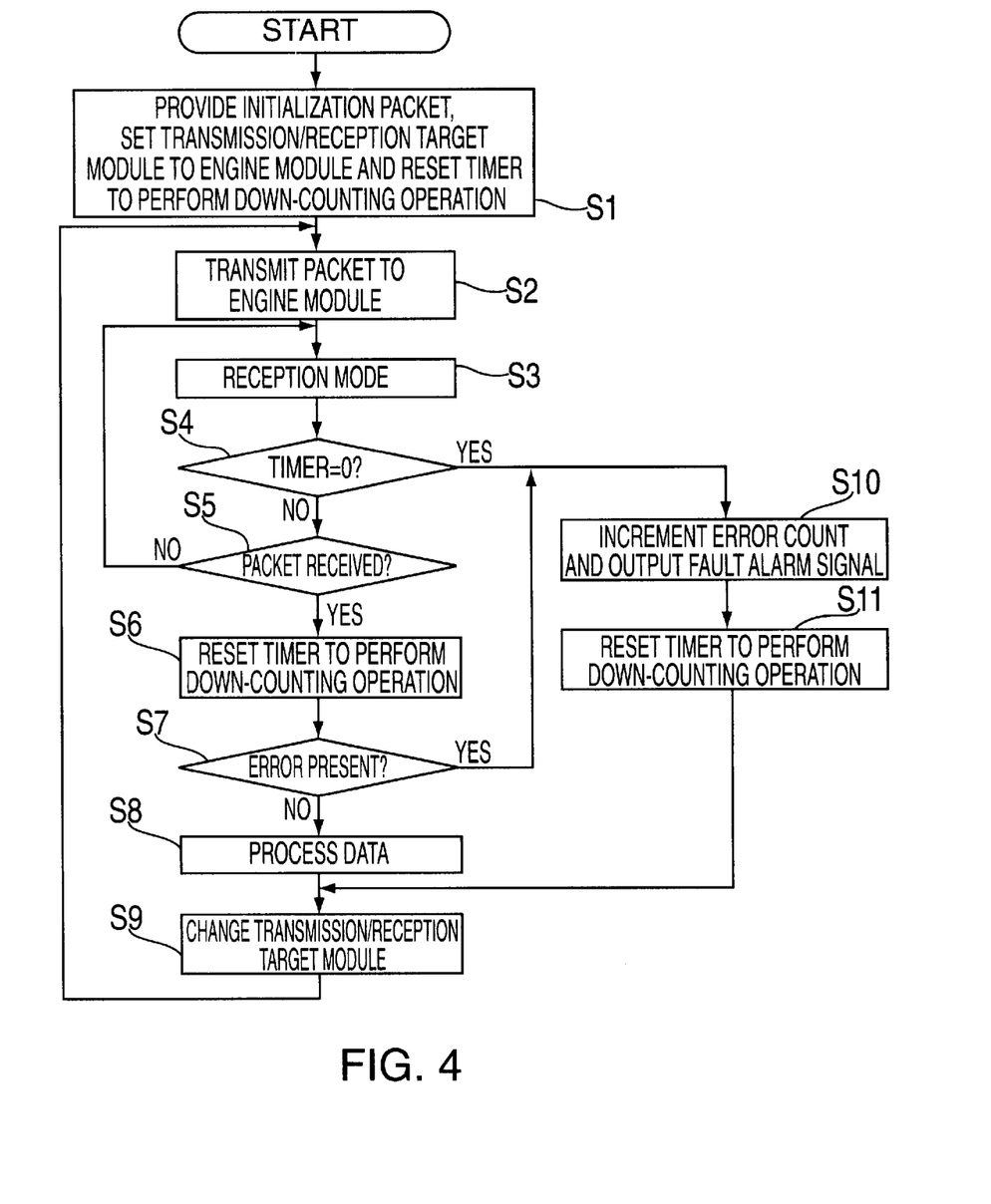
FIG. 4 is a flowchart illustrating an operation of a main controller in the operation module shown in FIG. 2 which transmits a packet to the engine module or hydraulic module in accordance with the present invention.
Figure 5:
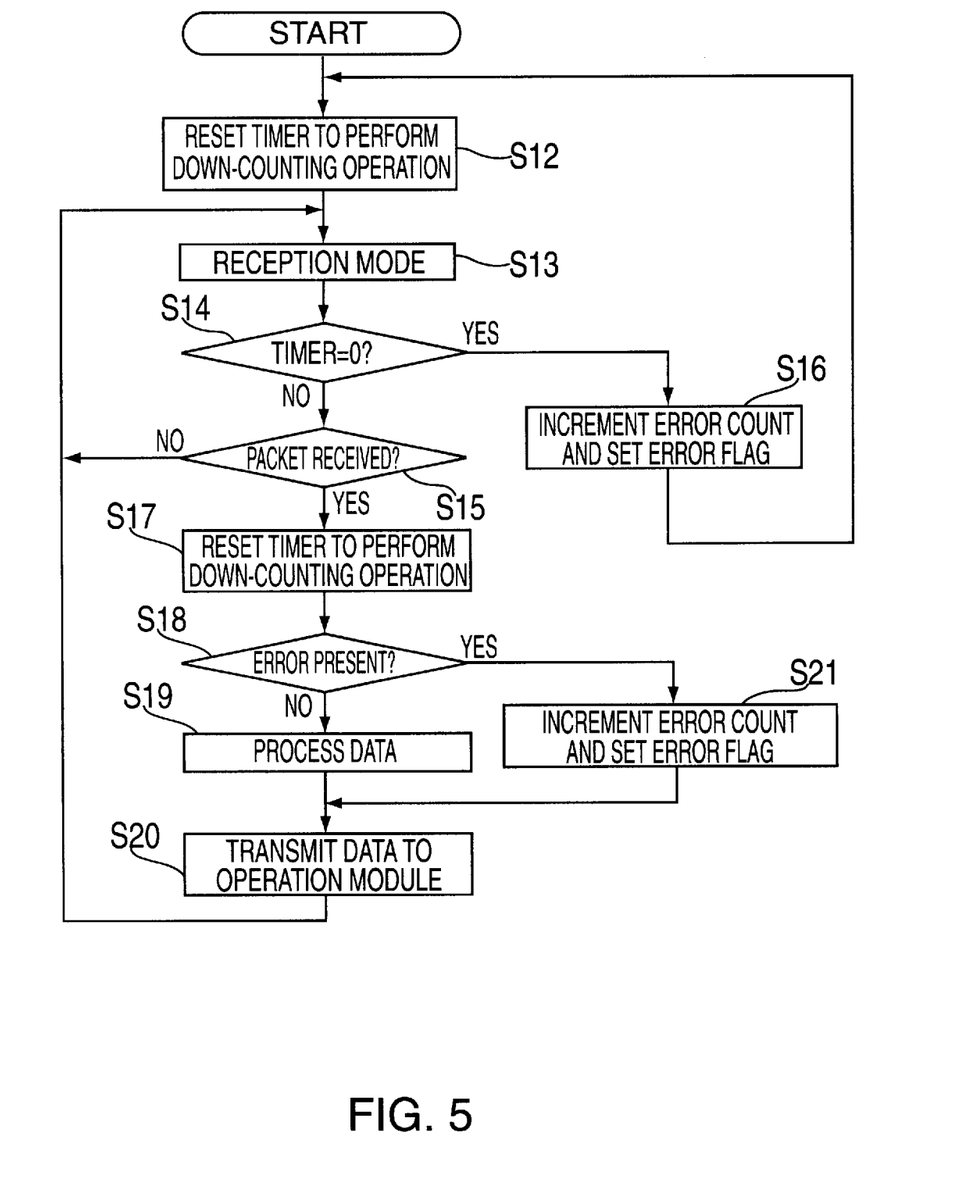
FIG. 5 is a flowchart illustrating an operation of a main controller in the engine module or hydraulic module shown in FIG. 2 which transmits a packet to the operation module in accordance with the present invention.

FIGS. 4 and 5 show communication algorithms for the data transmission and reception between the operation module 1 and the engine module 2 or the hydraulic module 3 in the form of the packets defined in the above Tables 3–6 according to a predetermined procedure.

In accordance with the preferred embodiment of the present invention, the operation module 1 has the entire transmission/reception control function for preventing the packets from colliding with each other during the communications with the engine module 2 and hydraulic module 3. Further, a count-down timer is provided to detect a fault in each module or an abnormal state of transmission lines.

The count-down timer is simple in construction and can be rearranged according to a system with no use of a separate hardware.

FIG. 4 is a flowchart illustrating an operation of the main controller 7 in the operation module 1 in FIG. 2 which transmits the packet to the engine module 2 or hydraulic module 3 in accordance with the present invention. If the system is started, the main controller 7 in the operation module 1 provides an initialization packet, sets a transmission/reception target module to, for example, the engine module 2 and resets a timer to perform a down-counting operation, at step S1. Then, the main controller 7 in the operation module 1 transmits the packet provided at the above step S1 to the engine module 2 at step S2 and enters a reception mode at step S3 to receive a packet from the engine module 2. The main controller 7 in the operation module 1 checks at step S4 whether a value of the timer is 0. If it is checked at the above step S4 that the value of the timer is not 0, the main controller 7 in the operation module 1 checks at step S5 whether the packet from the engine module 2 has been received. In the case where it is checked at the above step S5 that the packet from the engine module 2 has been received, the main controller 7 in the operation module 1 resets the timer at step S6 to perform the down-counting operation and performs a CRC operation at step S7 to check the presence of an error in the received packet. If it is checked at the above step S7 that no error is present in the received packet, the main controller 7 in the operation module 1 processes data in the received packet at step S8 to control various indicators according to allocated addresses. Then, at step S9, the main controller 7 in the operation module 1 provides the subsequent packet and changes the transmission/reception target module.

On the other hand, in the case where no packet from the engine module 2 is received under the condition that the value of the timer is 0 at the above step S4 or in the case where it is checked at the above step S7 that the error is present in the received packet, the main controller 7 in the operation module 1 increments an error count at step S10. Then at the above step S10, the main controller 7 in the operation module 1 compares the incremented error count with a predetermined threshold value and outputs a fault alarm signal if the incremented error count exceeds the predetermined threshold value as a result of the comparison. At step S11, the main controller 7 in the operation module 1 resets the timer to perform the down-counting operation and proceeds to the above step S9 to change the transmission/reception target module. As a result, the operation module 1 performs the transmission/reception operation with the subsequent module. In this manner, in the case where packets are frequently transmitted with an error or the reception of no packet from the engine module 2 frequently occurs, the operation module 1 outputs a message indicative of a fault and lights a warning lamp. Therefore, the operator can readily perform the fault diagnostic operation.

FIG. 5 is a flowchart illustrating an operation of the main controller 7 in the engine module 2 or hydraulic module 3 in FIG. 2 which transmits the packet to the operation module 1 in accordance with the present invention. The main controller 7 in, for example, the engine module 2 resets a timer at step S12 to perform a down-counting operation and enters a reception mode at step S13 to receive a packet from the operation module 1. The main controller 7 in the engine module 2 checks at step S14 whether a value of the timer is 0. If it is checked at the above step S14 that the value of the timer is not 0, the main controller 7 in the engine module 2 checks at step S15 whether the packet from the operation module 1 has been received. In the case where no packet from the operation module 1 is received under the condition that the value of the timer is 0 at the above step S14, the main controller 7 in the engine module 2 increments an error count and sets an error flag at step S16. Then, the main controller 7 in the engine module 2 returns to the above step S12.

However, in the case where it is checked at the above step S15 that the packet from the operation module 1 has been received, the main controller 7 in the engine module 2 resets the timer at step S17 to perform the down-counting operation and performs a CRC operation at step S18 to check the presence of an error in the received packet. If it is checked at the above step S18 that no error is present in the received packet, the main controller 7 in the engine module 2 processes data in the received packet at step S19 to drive various actuators in accordance with the processed data. At step S20, the main controller 7 in the engine module 2 receives data from various sensors and transmits the received data in the form of packet to the operation module 1. Then, the main controller 7 in the engine module 2 returns to the above step S13 to enter the reception mode. On the other hand, in the case where it is checked at the above step S18 that the error is present in the received packet, the main controller 7 in the engine module 2 increments an error count at step S21. Then at the above step S21, the main controller 7 in the engine module 2 compares the incremented error count with a predetermined threshold value and sets an error flag if the incremented error count exceeds the predetermined threshold value as a result of the comparison. Then, the main controller 7 in the engine module 2 proceeds to the above step S20 to transmit the packet to the operation module 1. At this time, the main controller 7 in the engine module 2 sets the error bit in the Table 6 to 1 to inform the operator of the abnormal state.

Noticeably, the operation times of the timers must appropriately be set to secure the respondency and accuracy of the system. Preferably, in connection with the engine module 2, the operation time of the timer in the operation module 1 can be obtained by adding up the processing time of the operation module 1, the transmission/reception time of the operation module 1 with the engine module 2, the processing time of the engine module 2 and extra time. Similarly, the operation time of the timer in the operation module 1 can be set in the above manner in connection with the hydraulic module 3. More preferably, the timer in the operation module 1 can have a longer one of the above two operation times. Further, the operation times of the timers in the engine module 2 and hydraulic module 3 can preferably be obtained by adding the above two operation times of the timer in the operation module 1.

The communication controller 10 transmits the defined packet in the unit of byte. At this time, a parity bit may be transmitted instead of the CRC bits. In other words, in the case where the amount of information to be transmitted is small, it is efficient to transmit the parity bit. However, in the case where the amount of information to be transmitted is large, it is efficient to transmit the CRC bits.

Figure 6:
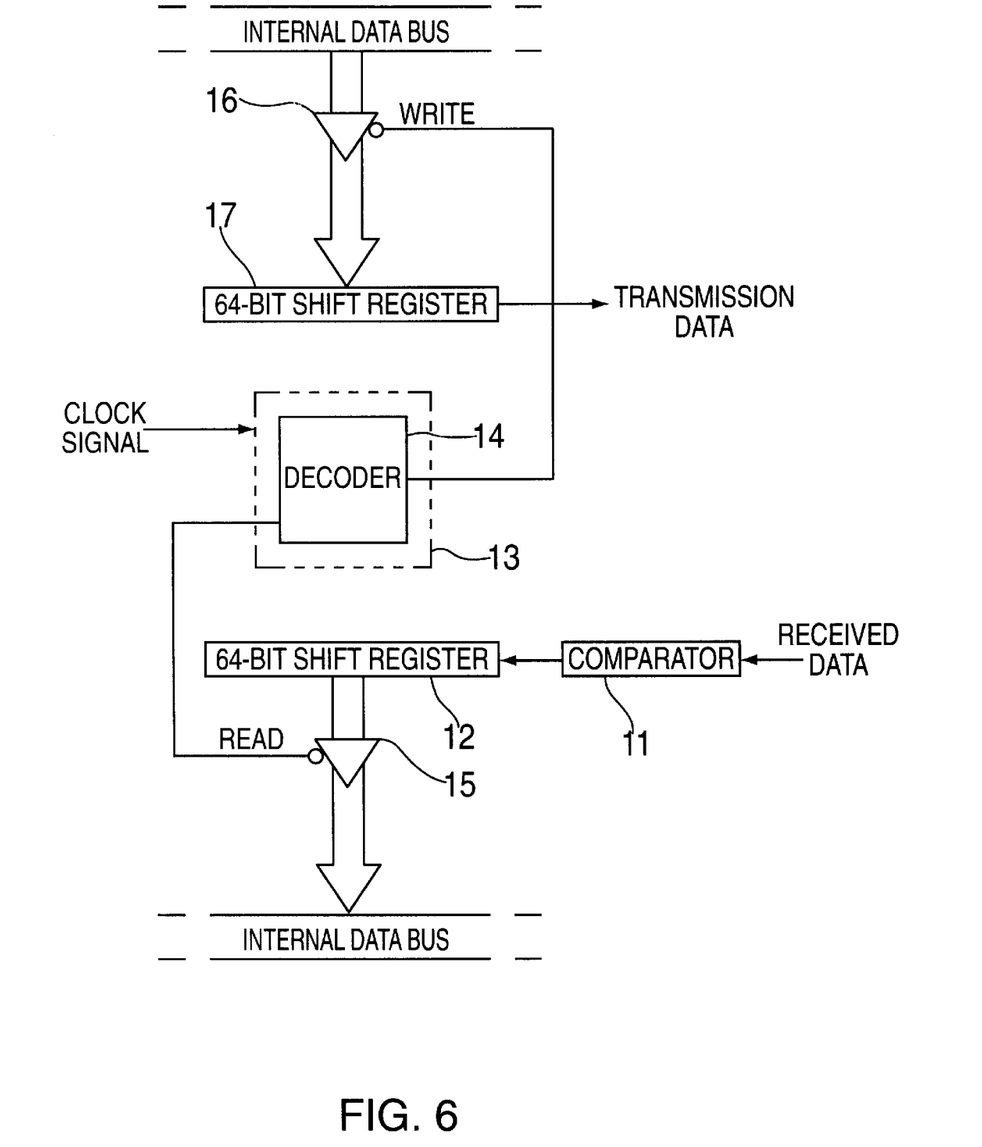
FIG. 6 is a schematic block diagram of a communication interface for packet communication in accordance with the present invention.

FIG. 6 is a schematic block diagram of a communication interface for the packet communication in accordance with the present invention. As shown in this drawing, a comparator 11 is provided to compare received initial data with a start frame. If the received initial data is in accord with the start frame, the comparator 11 transfers the subsequent data to a shift register 12. Because the packet has the maximum 56 bits in the system, the shift register 12 has the capacity of 64 bits to receive all the data in the packet. When an end frame is received, the reception state of the comparator 11 is released.

The data stored in the shift register 12 are transmitted in the unit of byte over a data bus through a buffer 15 selected by a decoder 14 in a transmission/reception controller 13, and then read by the processor. Noticeably, the packets in the modules 1–3 must be synchronized for the transmission and reception. In this connection, the transmission/reception controller 13 controls the entire communication operation under the condition that the modules 1–3 transmit the same number of symbols per second. In other words, the transmission/reception controller 13 outputs a shift clock to the shift register 12 in response to an internal clock. When all the data are received by the shift register 12, the transmission/reception controller 13 decodes the buffer 15 connected to the shift register 12 to allow the processor to extract the data therefrom in the unit of 8 bits.

For the transmission, the data in the packet are sequentially applied to a 64-bit shift register 17 through a buffer 16 under the control of the decoder 14. The data stored in the shift register 17 are transmitted in response to the shift clock. At this time, a CRC operation is performed by a software to check a transmission error.

In accordance with the preferred embodiment of the present invention, the 64-bit shift registers 17 and 12 are provided respectively at the transmission and reception stages to perform a full-duplex communication operation.

As apparent from the above description, the distributed control system for the heavy construction machine has the following advantages.

First, the components in the heavy construction machine are classified into a plurality of modules according to functions and the modules are individually constructed.

Therefore, the number of wires is significantly reduced, thereby making the wiring in assembling and repairing very easy.

Second, the functions are individually performed by modules. Therefore, the design modification is readily made in replacing and adding modules. Further, the design is readily made regardless of the wired state to add a new module.

Third, because the wiring is very simple due to the modularized construction, the maintenance is simply performed. Further, each module performs the self-diagnostic function to analyze the origin of a fault. Therefore, when the heavy construction machine fails, the corresponding portion can readily be identified and repaired. Namely, the faulty portion can be very rapidly and accurately repaired.

Fourth, additional sensors and controllers can readily be provided for the automatization of the heavy construction machine under the condition that the inter-module construction is not modified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distributed control system for a heavy construction machine, comprising:

a main control module for sending operation signals and receiving modular signals via a single line, said signals being packet signals comprising error correction code;

a first module for controlling a first part of the heavy construction machine, said first module receiving operation signal from the main control module and sending the modular signals which indicate status of the first part under the control of the first module; and a second module for controlling a second part of the heavy construction machine, said second module receiving operation signals from the main control module and sending the modular signals which indicate status of the second part under the control of the first module;

wherein said main control module determines as error when the modular signals are not received within a predetermined time.

2. The distributed control system for a heavy construction machine according to claim 1, wherein a timer connected to the main control module counts the predetermined time.

3. The distributed control system for a heavy construction machine according to claim 1, wherein said main control module is an engine module and said first module is an engine module and said second module is a hydraulic module.

4. The distributed control system for a heavy construction machine according to claim 1, wherein said modules comprises:

a main controller for controlling parts of the heavy construction machine;

an input/output terminal for sending and receiving signals from other modules;

a communication controller for storing data which is to be sent in the modular signal under the control of the main controller; and a memory for storing a program for controlling the part of the heavy construction machine.

5. The distributed control system for a heavy construction machine according to claim 4, wherein said communication controller comprises:

a first shift register for storing the received data;

a second shift register for storing the data to be sent; and a decoder for enabling the main controller to read the first shift register and write the second shift register.

6. The distributed control system for a heavy construction machine according to claim 5, wherein said communication controller further comprises a comparator unlocking reception status of the communication controller when an end signal of the data is received, said comparator being disposed between the single line and the first shift register.

7. A distributed control system for a heavy construction machine, comprising:

a main control module for sending operation signals and receiving modular signals via a single line, said signals being packet signal comprising error correction code;

a first module for controlling a first part of the heavy construction machine, said first module receiving operation signals from the main control module and sending the modular signals which indicates status of the first part under the control of the first module;

a second module for controlling a second part of the heavy construction machine, said second module receiving operation signals from the main control module and sending the modular signals which indicates status of the second part under the control of the first module; and a timer associated with the main control module;

wherein said main control module determines as error when the modular signals are not received within a predetermined time;

and wherein each of said main, first and second modules comprises:

a main controller for controlling parts of the heavy construction machine;

an input/output terminal for sending and receiving signals from other modules;

a communication controller comprising a first shift register for storing the received signal from other module, a second shift register for storing the data to be sen to other module, and a decoder for enabling the main controller to read the first shift register and write the second shift register; and a memory for storing a program for controlling the part of the heavy construction machine under the control of the module.

8. A method of controlling a distributed control system comprising a main control module, a first module and a second module communicating with the main module via a single line by packet signals, wherein said main control module performs in sequence the steps of:

providing an initializing packet when the system starts;

transmitting the provided packet to the first module which enables a reception mode of the first module;

receiving a packet from the first module and determining as error when the packet is not received within a predetermined time;

processing data in the received packet to control indicators according to allocated addresses;

providing a subsequent package and switching to the second module;

transmitting the subsequent packet to the second module which enables a reception mode of the second module; and receiving a packet from the second module and determining as error when the packet is not received within a predetermined time.

9. The method of controlling a distributed control system according to claim 8, wherein the first module and the second module performs in sequence the steps of:

entering into a reception mode and receiving a packet from the main control module;

processing data in the received packet to drive various actuators according to the processed data;

receiving data from sensors; and transmitting the received data in a form of a packet to the main control module.

* * * * *